Sept. 29, 1959 E. G. PERRY 2,906,381
METHODS OF ELIMINATING HYSTERESIS EFFECTS
IN THE MAGNETIC CLUTCH
Filed May 14, 1952

INVENTOR
Edward Gordon Perry
BY Stevens, Davis, Miller and Mosher
ATTORNEYS

United States Patent Office 2,906,381

Patented Sept. 29, 1959

2,906,381

METHODS OF ELIMINATING HYSTERESIS EFFECTS IN THE MAGNETIC CLUTCH

Edward Gordon Perry, Dallas, Tex., assignor to Texas Instruments Inc., Dallas, Tex., a corporation of Delaware Application May 14, 1952, Serial No. 287,787

7 Claims. (Cl. 192—21.5)

This invention relates to a method and apparatus for eliminating hysteresis effects in magnetic clutches.

An important problem in the field of magnetic clutches is hysteresis, that is, the flux density which remains in a material after the magnetizing force is removed. Hysteresis is caused by irreversible processes which result in energy dissipation causing heat. The higher the reluctance of a ferromagnetic material, the higher the residual magnetism, since more of the energy of the magnetizing current is dissipated. Therefore, if a curve of flux density is plotted against magnetizing force for any ferromagnetic material, both flux and magnetic force will be at zero for the material in its unmagnetized state. As the magnetizing force increases, the flux increases, tracing a curve, but on decreasing the magnetizing force, the plot of flux density follows a different curve so that when the force is again zero, there will still be a residual flux density.

The domain theory of permanent magnetism is that in a ferromagnetic material, the parallel locking of atomic magnetic moments in the crystalline structure extends throughout a limited but somewhat indefinite volume of a ferromagnetic crystal. Even when an iron crystal as a whole is unmagnetized, tiny neighboring regions are completely magnetized. Then individual regions, however, have their magnetic moments in different directions so that these moments add to zero over the whole crystal. When a field is applied to a substance containing a number of these crystals, the first effect is that domains having their magnetic moments in the genereal direction of the field are enlarged at the expense of neighboring domains whose magnetic moments are in less favorable directions. This is observed to happen only for very small applied fields. As the field is increased, the magnetic moments of domains in the next most favorable direction of the field become aligned. This effect takes place, not by realignment of the domain as a rigid body, but by alignment of the axis of spins of individual electrons within the domain. Because of the number of moments not parallel to the direction of the applied field, a third effect becomes apparent with magnetizing forces greater than that required to align domain moments more nearly in line with the field direction. This consists of orienting domain moments from the out of line direction to the field direction. Saturation is reached as all these domain moments become aligned in the direction of the applied field. Therefore, when a material has been subjected to a magnetizing signal and after the signal is removed there is a residual magnetism, it follows that more of the domains are aligned in the direction in which the signal was applied than prior to the application of the magnetizing signal.

The magnetic clutch such as a clutch of the particle type works on the principle that when a signal is applied to a coil in the clutch, or when a permanent magnet is brought close to a side, a flux is produced across the working gap of the clutch. A torque cup, or disc, attached to the output shaft is supported by the clutch housing to rotate freely in the working gap. As flux is produced, particles of iron powder in the working gap forms lines of force which the torque cup must disturb in order to rotate. Therefore, a torque is produced in the output shaft relative to the strength of the signal. When this magnetizing signal is removed, a torque is still produced due to the remaining or residual magnetism in the clutch and field core. Another effect on the output is that this residual flux will either aid or oppose the next applied signal so that the output will be an erroneous measure of the signal if the clutch is embodied in a measuring instrument or the like.

It is an object of the present invention to provide a method and apparatus for eliminating hysteresis in magnetic clutches.

It is another object of this invention to eliminate hysteresis in magnetic clutches by the wiping action of a permanent magnet or electro-magnet. Following the domain theory of magnetism that residual magnetism is due to an increase in domain alignment with the direction of the applied signal, the present invention provides a method and apparatus which disrupts domain alignment and consequently eliminates hysteresis.

It is an object of this invention to eliminate hysteresis effects in both the clutch and the field core applying signals to the clutch.

Other and further objects of the present invention will become readily apparent from a detailed consideration of the following description when taken in conjunction with the drawings in which.

Figure 1:
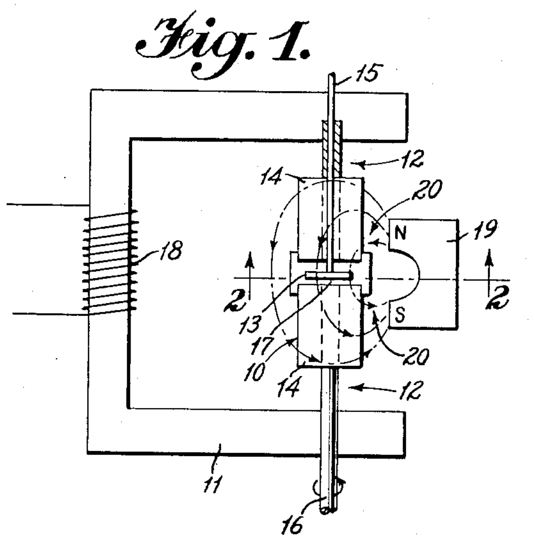
Figure 1 is a schematic representation of an embodiment of the present invention.
Figure 2:
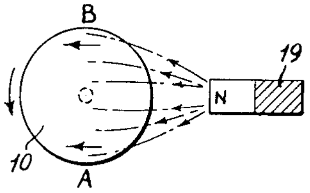
Figure 2 is a view in section taken along line 2—2.
Figure 3:
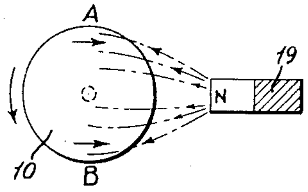
Figure 3 is a view in section similar to Figure 2.

Referring to the drawings in detail Figure 1 shows a magnetic clutch 10 mounted in a U-shaped field core 11 and separated from it by air gaps 12. Clutch 10 consists of a pair of members 14 separated by gap 17, with the lower member 14 connected to shaft 16. Torque cup or disc 13 is connected to shaft 15 and is mounted in clutch 10 so that it is free to rotate in gap 17. The shaft 15 is the driven shaft and shaft 16 is the driving shaft. If clutch 10 is of the particle type, iron powder is present in gap 17. Signal coil 18 is wound or wrapped around the closed end of field core 11 so that a signal can be transmitted to the magnetic clutch 10. A permanent magnet 19 is mounted adjacent to clutch 10 and axially disposed as shown so that it is separated from clutch 10 by air gaps 20. Flux from permanent magnet 19 crosses air gap 20 at the north pole N and diffuses transversely and axially through clutch 10 before crossing air gap 20 at the south pole S of magnet 19, due to the lower reluctance of the clutch body over the reluctance of air. When clutch 10 is stationary, it will be magnetized in the direction of the flux from magnet 19 as at points A and B in Figure 2. As the clutch 10 rotates 180° past the magnet 19, points A and B, as in Figure 3, will be opposed by the flux from magnet 19 and changed in direction or intensity or both. There will be an infinite number of these points which will be constantly changing in direction and intensity as the clutch 10 rotates. As a signal is applied to coil 18, a flux is produced in core 11 which crosses air gaps 12 and causes the clutch to magnetize in addition to the influence of magnet 19. Shaft 15 rotates or tends to rotate (if restrained as in a pushpull meter movement) with the rotating or driving shaft 16 due to the torque transmitted through clutch 10 relative to the strength of the signal. This signal magnetizes the clutch 10 so that there would be a residual magnetism when the signal is removed. Due to the permanent magnet 19 the clutch actually feels no effects of hysteresis, since it is wiped out by the opposing flux from magnet 19 as clutch 10 rotates. It can thus be seen that the clutch 10 is in equilibrium due to the action of permanent magnet 19.

Figure 1 shows a clutch in which the signal is applied through a field core. If desired, the signal coil and magnetic circuit equivalent to the field core and signal coil of Figure 1 could be built into the clutch. In this design, the entire clutch, coil, and magnetic circuit would rotate past a permanent magnet and signals to actuate the clutch would be applied through collector rings. Residual magnetism resulting from an applied signal would be eliminated in the same manner as in the clutch in Figure 1, since all parts would rotate past the permanent magnet and flux in the entire unit would be constantly changed in direction and/or intensity.

Further, the magnet could also apply a bias flux so that the clutch produced a torque continuously. This torque could be changed by the direction and intensity of signal flux. If this bias is not desired, a magnet of equal effective strength and opposite polarity could be applied at another side to cancel the bias effect and increase the wiping effect. By changing magnet strength or air gaps, the ratio of bias to wipe could be controlled.

This invention also contemplates the elimination of the hysteresis effect in the field core through which signals are applied to the magnetic clutch. As in the magnetic clutch, a residual magnetism will remain in the field core after a given signal is applied and removed which will affect the magnetic clutch unless eliminated. Three methods of accomplishing this are shown in Figures 4, 5 and 6.

Figure 4:
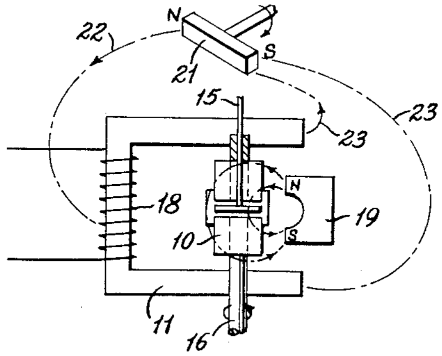
Figure 4 is a schematic representation of a further embodiment of the present invention.

In Figure 4, the basic arrangement, as in Figure 1, remains the same and to it is added the elements necessary to eliminate hysteresis in the field coil 18. This is done by a rotating permanent magnet 21, flux path 22 connected to the midpoint of the closed end of core 11, and flux paths 23 each connected to the end of a leg of core 11. As the magnet 21 rotates, current will reverse in the flux paths 22 and 23 and in the field core 11 for each 180° rotation. This means that under the domain theory the direction of magnetization will be constantly reversed, the frequency depending on the speed of rotation. Therefore, any residual magnetism in the core as a result of an applied signal will be eliminated by an opposing flux regardless of direction of residual magnetization. As a practical matter, residual magnetism will be eliminated as it develops.

Figure 5:
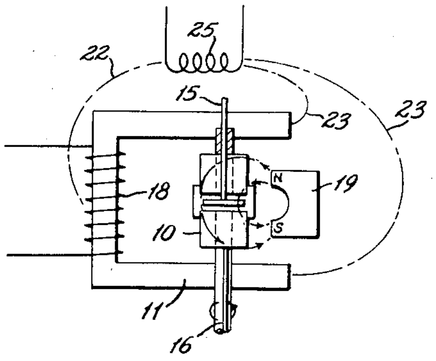
Figure 5 is a schematic representation of another modification of the present invention.

The embodiment shown in Figure 5 is similar to the one shown in Figure 4, except that an alternating current coil 25 is employed in place of rotating permanent magnet 21. The alternating current in the coil 25 causes a constant reversal of the direction of magnetism which in turn eliminates hysteresis. In principle, the arrangements of Figures 4 and 5 are analogous.

Figure 6:
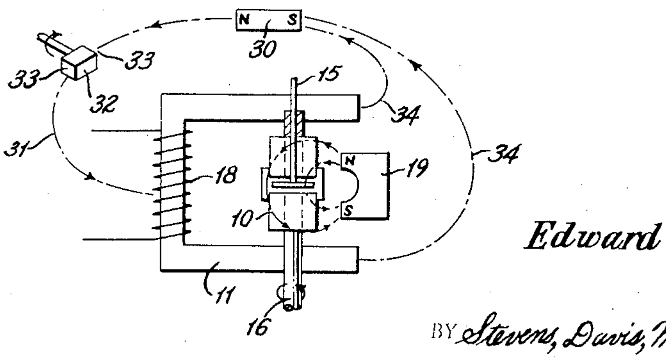
Figure 6 is a schematic representation of still another embodiment of the present invention.

The method and apparatus illustrated in Figure 6 is similar to the method and apparatus shown in Figures 4 and 5. The difference between the two methods is that in the arrangements of Figures 4 and 5 the flux is continually reversed whereas in the arrangement of Figure 6 the flux intensity is continually varied, disrupting the domain alignment rather than completely reversing the alignment. Hysteresis can be as effectively eliminated by disrupting domain alignment so that the net sum of their moments is zero as by continual reversal. The components used in the arrangement of Figure 6, in addition to those shown in Figure 1, are a stationary permanent magnet 30, magnetic path 31 with a section removed and replaced by a rotating (or oscillating) equivalent section of the magnetic path 32 with an air gap 33 on either side of the rotating segment, and magnetic paths 34. Magnetic path 31 is connected to the midpoint of the closed end of core 11 and paths 34 are each connected to the end of a leg of core 11. The magnet 30 sends a unidirectional flux through the magnetic circuit and field core 11. The effect of the rotating segment 32, which is not a magnet, is to vary the flux in the circuit by varying the widths of the air gaps 33. Therefore, any residual magnetism in the field core will be subjected to the influence of a varying flux and will in turn be disrupted, eliminating the residual magnetism.

From the above it will be noted that the elimination of hysteresis in the clutch members is effected by the continuous rotation of the clutch past the permanent magnet. It is the rotation of the clutch past the permanent magnet which eliminates the residual magnetism and creates an infinite number of constantly changing forces which result in an equilibrium condition in the clutch.

It is important to appreciate that as hysteresis is eliminated in the clutch by the permanent magnet, the purpose of eliminating hysteresis in the field core is to prevent erroneous transmission or measurement of signals applied to field coil 18. The alternating current as used in the arrangement of Figure 5 is applied to field core 11 and not directly to the clutch members. Any hysteresis in the field core will indirectly affect the magnetic clutch depending upon the reluctance of the air gap between the core and clutch and the amount of residual magnetism in the core.

While this invention has been shown and described in conjunction with specific embodiments, nevertheless, various changes and modifications obvious to one skilled in the art are within the spirit, scope and contemplation of the present invention.

I claim:

1. A method for eliminating hysteresis effects in magnetic clutches of the type employing a field core and coil that comprises positioning a source of magnetic flux adjacent the clutch, establishing a flux path substantially transversely through the clutch, rotating the clutch to cause the flux path to be continually reversed, establishing another source of magnetic flux, establishing a flux path between the other source and the field core and through the field core, and continually varying the flux passing through the field core from the other source.

2. A method for eliminating hysteresis effects in magnetic clutches of the type employing a field core and coil that comprises positioning a source of magnetic flux adjacent the clutch, establishing a flux path substantially transversely through the clutch, rotating the clutch to cause the flux path to be continually reversed, establishing another source of magnetic flux, establishing a flux path between the other source and the field core and through the field core, and continually reversing the direction of the flux passing through the field core from the other source.

3. In a magnetic clutch of the type having a U-shaped field core, a field coil wound around the closed end of the core serving as a clutch signal input means, and a pair of coaxially arranged clutch engaging members disposed between the open end of the core, the improvement that comprises a magnet located externally adjacent the clutch engaging members to apply a flux transversely through said clutch engaging members, a second flux source located adjacent the field core, means positioning said second flux source so that flux can pass from said second flux source to a point substantially midway between the field core ends, through both halves of the core to its ends and thence back to said second flux source, and means for continually varying the flux passing through the field core from said second flux source.

4. In a magnetic clutch of the type having a U-shaped field core, a field coil wound around the closed end of the core serving as a clutch signal input means, and a pair of coaxially arranged clutch engaging members disposed between the open end of the core, the improvement that comprises a magnet located externally adjacent the clutch engaging members to apply a flux transversely through said clutch engaging members, a second flux source located adjacent the field core, means positioning said second flux source so that flux can pass from said second flux source to a point substantially midway between the field core ends, through both halves of the core to its ends and thence back to said second flux source, and means for continually reversing the flux passing through the field core from said second flux source.

5. In a magnetic clutch of the type having a U-shaped field core, a field coil wound around the closed end of the core serving as a clutch signal input means, and a pair of coaxially arranged clutch engaging members disposed between the open end of the core, the improvement that comprises a magnet located externally adjacent the clutch engaging members to apply a flux transversely through said clutch engaging members, a second coil located adjacent the field core, means positioning said second coil so that flux can pass from said second coil to a point substantially midway between the field core ends, through both halves of the core to its ends and thence back to said second coil, and means to supply alternating current to said second coil.

6. In a magnetic clutch of the type having a U-shaped field core, a field coil wound around the closed end of the core serving as a clutch signal input means, and a pair of coaxially arranged clutch engaging members disposed between the open end of the core, the improvement that comprises a magnet located externally adjacent the clutch engaging members to apply a flux transversely through said clutch engaging members, a second magnet located adjacent the field core, means positioning said second magnet so that flux can pass from said second magnet to a point substantially midway between the field core ends, through both halves of the core to its ends and thence back to said second magnet, and means for continually varying the flux passing through the field core from said second magnet.

7. In a magnetic clutch of the type having a U-shaped field core, a field coil wound around the closed end of the core serving as a clutch signal input means, and a pair of coaxially arranged clutch engaging members disposed between the open end of the core, the improvement that comprises a magnet located externally adjacent the clutch engaging members to apply a flux transversely through said clutch engaging members, a second magnet located adjacent the field core, means positioning said second magnet so that flux can pass from said second magnet to a point substantially midway between the field core ends, through both halves of the core to its ends and thence back to said second magnet, and means for continually reversing the flux passing through the field core from said second magnet.

References Cited in the file of this patent

UNITED STATES PATENTS

| | | |
|---|---|---|
| 701,290 | Buck | June 3, 1902 |
| 704,574 | Pintsch | July 15, 1902 |
| 774,922 | Troy | Nov. 15, 1904 |
| 811,654 | Murphy | Feb. 6, 1906 |
| 1,367,727 | Wotton | Feb. 8, 1921 |
| 2,118,174 | Doane | May 24, 1938 |
| 2,296,764 | Braden | Sept. 22, 1942 |
| 2,411,055 | Rich | Nov. 12, 1946 |
| 2,441,984 | Armstrong | May 25, 1948 |
| 2,544,360 | Schmidt | Mar. 6, 1951 |
| 2,612,248 | Feiertag | Sept. 30, 1952 |
| 2,614,668 | Waderlow et al. | Oct. 21, 1952 |
| 2,661,825 | Winslow | Dec. 8, 1953 |

FOREIGN PATENTS

| | | |
|---|---|---|
| 64,301 | Switzerland | Mar. 7, 1913 |

OTHER REFERENCES

Technical News Bulletin: National Bureau of Standards; volume 34 No. 12, December 1950, pp. 169–174.

The Magnetic Particle Powder Clutch—Electrical Engineering January 1951, pp. 57–59.